United States Patent

Matsumoto et al.

[11] Patent Number: 5,916,965
[45] Date of Patent: Jun. 29, 1999

[54] AQUEOUS POLYURETHANE RESIN AND GRAFTED POLYMER THEREON

[75] Inventors: Satoshi Matsumoto, Kanagawa; Yoshiaki Matsukura, Yokohama, both of Japan

[73] Assignee: BASF Coatings AG, Muenster-Hiltrup, Germany

[21] Appl. No.: 09/077,907

[22] PCT Filed: Nov. 22, 1996

[86] PCT No.: PCT/EP96/05168

§ 371 Date: Jul. 6, 1998

§ 102(e) Date: Jul. 6, 1998

[87] PCT Pub. No.: WO97/20874

PCT Pub. Date: Jun. 12, 1997

[30] Foreign Application Priority Data

Dec. 7, 1995 [JP] Japan .................................. 7-319227

[51] Int. Cl.$^6$ ................................ C08J 3/00; C08K 3/20; C08L 75/00

[52] U.S. Cl. ........................... 524/591; 524/507; 524/839; 524/840

[58] Field of Search .................................. 524/591, 839, 524/840, 507

[56] References Cited

U.S. PATENT DOCUMENTS 3,397,184  8/1968  Heydkamp et al. .................... 260/77.5

FOREIGN PATENT DOCUMENTS

| | | |
|---|---|---|
| 0 262 529 A2 | 4/1988 | European Pat. Off. ........ C08G 18/08 |
| 0 353 797 | 6/1989 | European Pat. Off. ........ C08G 18/08 |
| 0 424 705 A2 | 10/1990 | European Pat. Off. ...... C08F 283/00 |
| 0 522 419 A1 | 6/1992 | European Pat. Off. ........ C08G 18/67 |
| 522419-A1 | 1/1993 | European Pat. Off. . |
| 61-2720 | 1/1986 | Japan ............................ C08F 299/06 |
| 63-145318 | 6/1988 | Japan ............................. C08G 18/38 |
| 2-64116 | 3/1990 | Japan ............................ C08F 299/06 |
| 7-2827 | 1/1995 | Japan ............................ C07D 311/72 |
| 3-174479 | 7/1997 | Japan ............................ C09D 133/00 |

OTHER PUBLICATIONS

Database "Chemical Abstracts" (Host: STN); Abs. 110: 9398 Colombus, OH, USA.

*Primary Examiner*—Patrick D. Niland

[57] ABSTRACT

To obtain water-based paint compositions which have outstanding storage stability and can also form paint films with outstanding appearance and water resistance.

Water-based paint composition containing a hardener at 50–10 parts by weight to 50–90 parts by weight (solids) of an aqueous dispersion obtained by polymerizing an aqueous dispersion of a polyurethane resin of a number-average molecular weight of 1000–50,000, an acid value from carboxyl groups of $\leq 50$ mg KOH/g, a sulfonate group content of 0.05–0.6 mol/1000 g, an allyl content of 0.1–1.1 mol/molecule and an acetate tolerance of $\geq 5$ in the aqueous dispersion with ethylenic unsaturated monomers in a proportion as a weight ratio of polyurethane resin/ethylenic unsaturated monomer of 5/95–60/40.

3 Claims, No Drawings

AQUEOUS POLYURETHANE RESIN AND GRAFTED POLYMER THEREON

BACKGROUND OF THE INVENTION

1. Technical Field of the Invention

The present invention relates to aqueous dispersions of polyurethane resins, aqueous dispersions of polyurethane resin graft polymers for which the former are both starting materials and stabilizers, and water-based paint compositions.

2. Prior Art

Water-based paint compositions have come to be widely used to replace solvent-based paints because they are superior from the point of view of environmental preservation and worker safety. For example, in the field of base coats for painting the outer skin of automobiles, etc., there has been a progressive change from solvent-based base coats using large quantities of organic solvents to water-based base coats using water as a carrier.

In Japanese Unexamined Patent 2-64116 (EP 353,797 A1) a polyurethane/acrylic emulsion varnish made by mixing an ethylenic unsaturated monomer and a polyurethane resin and emulsion polymerizing in an aqueous medium is disclosed as a resin in aqueous dispersion which can be employed in water-based base coats. However, during the synthesis of this polyurethane/acrylic emulsion varnish it is difficult to form a stable emulsion of the ethylenic unsaturated monomer in water by means of the surfactant capacity of the urethane oligomer, and consequently a low-molecular-weight emulsifier has to be employed to form a the ethylenic unsaturated monomer into a stable emulsion. This narrows the scope for selection of ethylenic unsaturated monomers, and narrows the scope for designing resins that can be synthesized. There is also the problem that the water-resistance of paint films in which these emulsions are employed is poor. Moreover, the ethylenic unsaturated monomer is employed as a solvent in order to lower the viscosity of the urethane oligomer, and therefore a polymerization inhibitor is necessary in order to prevent thermopolymerization of the ethylenic monomer during the synthesis; as a consequence percentage polymerization is lowered and it is difficult to obtain the intended varnish when the varnish emulsion is emulsion polymerized using urethane as the emulsifier.

A water-based coating composition disclosed in Japanese Unexamined Patent 3-174479 which comprises an acrylic polymer of specific composition and a polyurethane dispersion is also basically a mixed dispersion of an acrylic polymer and polyurethane, which has the problem of poor stability.

Japanese Unexamined Patent 61-2720 also discloses an acrylic emulsion made by emulsion polymerizing ethylenic unsaturated monomer(s) using an anionic or cationic water-dispersible urethane oligomer as the emulsifying agent. However, in synthesizing this varnish emulsion it is difficult to form the ethylenic unsaturated monomer into a stable emulsion in the aqueous medium by means of the surfactant capacity of the water-dispersible urethane oligomer alone, which narrows the scope for selection of ethylenic unsaturated monomers and narrows the scope for designing the resins that can be synthesized. In addition, the water resistance of the resulting paint films is poor because of the surfactant used during synthesis. Moreover, there is the problem that when employed in mixtures with other starting materials storage stability is poor and coagulation is prone to occur.

Japanese Examined Patent 7-2827 also discloses water-based paint compositions which contain an acrylic emulsion made by polymerizing ethylenic unsaturated monomers using as an emulsifying agent a macromolecular composition having urethane bonds and amphoteric ionic groups. However, the synthesis of the macromolecular composition which acts as an emulsifying agent is performed by extending the chain of a urethane oligomer using a primary and/or secondary polyamine as a chain extension agent to obtain a macromolecular composition, and consequently there is the problem that paint films containing this macromolecular composition have poor basic paint film properties such as resistance to heat-induced yellowing and resistance to light-induced yellowing, etc., as a result of the chain extension agents above.

The purpose of the present invention is to offer aqueous dispersions of polyurethane resins which have outstanding dispersion stability and which can polymerize with various ethylenic unsaturated monomers, which are aqueous dispersions formed by dispersing in an aqueous medium a polyurethane resin which has a molecule which includes free-radical-polymerizable unsaturated bonds.

Another purpose of the present invention is to offer aqueous dispersions of polyurethane resin graft polymers in which the quantity of coagulation during polymerization is small, which have outstanding dispersion stability, and can also form paint films with outstanding appearance and water resistance, etc., which are aqueous dispersions of a polyurethane graft copolymer obtained by polymerizing an aqueous dispersion of a polyurethane resin above with ethylenic unsaturated monomer(s).

A separate purpose of the present invention is to offer water-based paint compositions which have outstanding storage stability and can also form paint films with outstanding appearance and basic paint film performance traits such as water resistance, etc., which are water-based paint compositions which include an aqueous dispersion of a polyurethane resin graft polymer above.

SUMMARY OF THE INVENTION

The present invention has aqueous dispersions of a polyurethane resin, aqueous dispersion of a polyurethane resin graft polymer and water-based paint compositions as follows.

(1) An aqueous dispersion of a polyurethane resin, which is an aqueous dispersion of a polyurethane resin characterized in that the aforementioned polyurethane resin has a number-average molecular weight of 1000–50,000, an acid value from carboxyl groups of $\leq 50$ mg KOH/g, a content of sulfonic acid groups and/or sulfonate groups of 0.05–0.6 mol per 1000 g of polyurethane resin, a content of allyl moieties of 0.1–1.1 mol per molecule of polyurethane resin, and an acetate tolerance of $\geq 5$.

(2) An aqueous dispersion of a polyurethane graft polymer, characterized in that it is obtained by polymerizing, in an aqueous medium, an aqueous dispersion of a polyurethane resin according to (1) above and ethylenic unsaturated monomers in proportions as a weight ratio of polyurethane resin/ethylenic unsaturated monomer of 5/95–60/40.

(3) A water-based paint composition characterized in that it contains a hardener at 50–10 parts by weight to 50–90 parts by weight (solids) of an aqueous dispersion of a polyurethane resin graft polymer according to (2) above (total of both is 100 parts by weight).

Polyurethane resins dispersed in aqueous dispersions of a polyurethane resin of the present invention have a number-average molecular weight of 1000–50,000, and preferably 2000–20,000, an acid value from carboxyl groups of ≦50 mg KOH/g, and preferably ≦30 mg KOH/g, a content of sulfonic acid groups and/or sulfonate groups of 0.05–0.6 mol, and preferably 0.1–0.4 mol, per 1000 g of polyurethane resin, a content of allyl moieties of 0.1–1.1 mol, and preferably 0.3–1.0 mol, per molecule of polyurethane resin, and an acetate tolerance of ≧5, and preferably ≧10.

When the number-average molecular weight of the polyurethane resin is less than 1000, the stabilizing capacity of the aqueous dispersion of the polyurethane resin of the present invention is poor when it is used as starting material and stabilizer during polymerization in an aqueous medium with the ethylenic monomers discussed later, and this limits the ethylenic unsaturated monomers that can be employed. In addition, a lot of coagulation is produced in synthesizing the aqueous dispersion. On the other hand, a number-average molecular weight in excess of 50,000 is undesirable because the viscosity of the polyurethane resin becomes high, making difficult to handle during the manufacturing process.

In passing, number-average molecular weight are polystyrene-equivalent number-average molecular weights determined using prior known gel permeation chromatography.

When the acid value of the polyurethane resin from carboxyl groups exceeds 50 mg KOH/g the polyurethane resin becomes highly hydrophilic, and the viscosity of the aqueous dispersions when the polyurethane resin is dispersed by emulsification in an aqueous medium is considerably elevated. The water-resistance of paint films formed from the paint compositions finally obtained is also poor.

When the content of sulfonic acid groups and/or sulfonate groups (abbreviated simply Lo sulfonate group content hereafter, with units of mol/1000 g) is less than 0.05 mol per 1000 g of aforementioned polyurethane resin, the stabilizing capacity of the aqueous dispersion of the polyurethane resin of the present invention is poor when it is used as starting material and stabilizer during polymerization in an aqueous medium with the ethylenic monomers discussed later, and this limits the ethylenic unsaturated monomers that can be employed. In addition, a lot of coagulation is produced in synthesizing the aqueous dispersion. On the other hand, when it exceeds 0.6 mol the polyurethane resin becomes highly hydrophilic, and the viscosity of the aqueous dispersions when the polyurethane resin is dispersed by emulsification in an aqueous medium is considerably elevated. The water-resistance of paint films formed from the paint compositions finally obtained is also poor.

When the content of allyl moieties (also called simply allyl content hereafter) in 1 molecule of the aforementioned polyurethane resin is less than 0.1 mol there are few binding points at which the polyurethane resin can react with ethylenic unsaturated monomers when an aqueous dispersion of polyurethane resin of the present invention is used as starting material and stabilizer during polymerization in an aqueous medium with the ethylenic monomers discussed later, and water-based paint compositions which include a resulting aqueous dispersion have poor stability. On the other hand, when it exceeds 1.1 mol a lot of coagulaton is produced when an aqueous dispersion of polyurethane resin of the present invention is used as starting material and stabilizer during polymerization in an aqueous medium with the ethylenic monomers discussed later.

Acetate tolerance is the weight of aqueous acetate solution at the point at which coagulation is produced when a 10 wt % aqueous solution of an acetate, formed by neutralizing acetic acid by mixing with N-dimethylethanolamine in the ratio (w/w) 40/60, is added dropwise to 100 g of an aqueous dispersion of the polyurethane resin of 10 wt % resin solids, prepared by mixing deionized water with polyurethane resin in which 80% of the acid value has been neutralized with N-dimethylethanolamine. The point at which coagulation is produced is the point at which the dry weight of coagulum separated by filtration using a 400 mesh filter reaches ≧50%.

Acetate tolerance is an index which indicates the degree of stability of the polyurethane resin.

When acetate tolerance is less than 5 the stabilizing capacity of the aqueous dispersion of the polyurethane resin of the present invention is poor when it is used as starting material and stabilizer during polymerization in an aqueous medium with the ethylenic monomers discussed later, and this limits the ethylenic unsaturated monomers that can be employed. A lot of coagulation is produced, particularly during polymerization of carboxyl-group-containing monomers, and in order to prevent this a comparatively large quantity of a low-molecular-weight surfactant needs to be used, which causes poor paint film water-resistance.

Polyurethane resins as above can be made, for example by a method such as the following. Reacting 1) a monohydroxy or dihydroxy compound having a sulfonic acid group, or salt thereof,
2) a dimethylolalkanoic acid,
3) a hydroxy compound having an allyl moiety,
4) a polyhydroxy compound of number-average molecular weight ≦400,
5) a polyether diol and/or polyester diol of number-average molecular weight 500–5000, and
6) an aliphatic, alicyclic or aromatic diisocyanate compound, etc., in the presence or in the absence of an organic solvent which does not have in the molecule active hydrogen which can react with isocyanate groups.

Examples of monohydroxy compounds or dihydroxy compounds having a sulfonic acid group include monohydroxy compounds such as 2-hydroxyethanesulfonic acid and 3-hydroxypropanesulfonic acid, dihydroxy compounds such as 1,2-dihydroxyethanesulfonic acid and 1,4-dihydroxyethanesulfonic acid, etc., and polyester dials containing a terminal a sulfonic acid group, obtained by polycondensation of a dicarboxy compound containing a sulfonic acid group, such as 1,3-dicarboxybenzenesulfonic acid for example, with a diol compound such as ethylene glycol, propylene glycol, 1,4-butanediol, 1,6-hexanediol, 3-methyl-1,5-pentanediol, neopentyl glycol or bis (hydroxymethyl)cyclohexane, etc., and optionally a dicarboxylic acid such as adipic acid, succinic acid, sebacic acid, glutaric acid, maleic acid, fumaric acid or phthalic acid, etc., for example. Similarly, examples of compounds having a sulfonate group include sodium salts, lithium salts and ammonium salts, etc., of the compounds having a sulfonic acid group above, obtained by neutralizing the compound having a sulfonic acid group, using a basic substance. These compounds can be employed singly, and they can also be employed in combinations of 2 or more.

Examples of dimethylolalkanoic acids of component 2) above include dimethylolacetic acid, dimethylolpropionic acid and dimethylolbutyric acid, etc. These can be employed singly, or they can be employed in combinations of 2 or more. Of the dimethylolalkanoic acids above, dimethylolpropionic acid is preferred.

Examples of dihydroxy compounds of component 3) above having an allyl moiety include trimethylolpropane monoalkyl ether and 1-allyloxypropane-2,3-diol, etc. These can be employed singly, or they can be employed in combinations of 2 or more.

Examples of polyhydroxy compounds of component 4) above of a number-average molecular weight of $\leq 400$ include the diol compounds given as examples of starting materials for aforementioned component 1) and their lower molecular weight alkylene oxide addition products (number-average molecular weight $\leq 400$), and trivalent alcohols such as glycerol, trimethylolethane and trimethylolpropane, etc., and their lower molecular weight alkylene oxide addition products (number-average molecular weight $\leq 400$). These can be employed singly, or they can be employed in combinations of 2 or more.

Examples of polyether diols and/or polyester diols of component 5) above of a number-average molecular weight of 500–5000 include polymers of alkylene oxides such as ethylene oxide and propylene oxide, etc., and/or heterocyclic ethers such as tetrahydrofuran, etc., such as polyethylene glycol, polypropylene glycol and polytetramethylene glycol, for example; they also include products of polycondensation of diol compounds given as examples of starting material of aforementioned component 1) and dicarboxylic acids, such as poly(ethylene adipate) and poly(butylene adipate), for example, and polycaprolactone diol, poly(3-methylvalerolactone) diol and polycarbonate diol, etc. These can be employed singly, or they can be employed in combinations of 2 or more.

Aliphatic, alicyclic or aromatic diisocyanate compounds of aforementioned component 6) include aliphatic diisocyanates such as hexamethylene diisocyanate, 2,2,4-trimethylene diisocyanate and lysine diisocyanate, etc., alicyclic diisocyanates such as 1,4-cyclohexane diisocyanate, isophorone diisocyanate and methylcyclohexylene diisocyanate, etc., aromatic diisocyanates such as tetramethylxylylene diisocyanate and tolylene diisocyanate, etc., and modified such diisocyanates (carbodiicide, uratedione and urateimine-containing modified products). These can be employed singly, or they can be employed in combinations of 2 or more. Of the diisocyanate compounds above isophorone diisocyanate, hexamethylene diisocyanate and tetra-methylxylene diisocyanate are preferred.

The molecular weight of the polyurethane resin can be adjusted by a known method. For example, it can be adjusted adjusting the ratio of the number of equivalents of component 6) employed relative to the number of equivalents of groups which can react with diisocyanate groups. It is also possible to adjust it by controlling the quantities of prepolymer containing isocyanate groups, made from component 1), component 2), component 3), component 4), component 5) and component 6), and the quantity of component 1) and/or component 4). Component 1) and/or component 4) function as terminal-group-forming agents or chain-extension agents.

By emulsifying and dispersing a polyurethane resin thus obtained after neutralizing $\leq 50\%$ of the acid value with a basic substance using a prior known method, or by simultaneously neutralizing and emulsifying/dispersing in an aqueous medium containing a basic substance, the polyurethane resin is auto-emulsified and a very stable aqueous dispersion of a polyurethane resin of the present invention can be obtained. The groups which are neutralized by the basic substance in this case are the sulfonic acid groups, sulfonate groups or carboxyl groups.

The basic substance employed in preparing aqueous dispersions of polyurethane resins of the present invention can be any basic substance which can neutralize sulfonic acid groups or carboxyl groups, without restriction. Concrete examples include trialkylamines such as trimethylamine, triethylamine and tripropylamine, etc., N-alkylmorpholines such as N-methylmorpholine and N-ethylmorpholine, etc., dialkyl-alkanolamines such as N-dimethylethanolamine and N-diethylethanolamine, etc., and inorganic basic compounds such as sodium hydroxide, potassium hydroxide and ammonia, etc. These can be employed singly, or they can be employed in combinations of 2 or more. Of the basic substances above N-dimethylethanolamine is preferred.

An aqueous dispersion of a polyurethane graft polymer of the present invention is obtained by polymerizing an aqueous dispersion of a polyurethane resin obtained as above and ethylenic unsaturated monomers. In this polymerization the aqueous dispersion of a polyurethane resin acts as a starting material and a stabilizer. Aqueous dispersions of the polyurethane resins have outstanding capacity to stabilize ethylenic unsaturated monomers in dispersion, and therefore it is possible to polymerize various ethylenic unsaturated monomers and there is wide scope for resin design. The main product of the polymerization is a graft polymer formed by graft polymerization of ethylenic unsaturated monomer to the allyl moieties in the polyurethane resin; incidental production of polymers of the ethylenic unsaturated monomer, and other by-products, can also be expected.

The ethylenic unsaturated monomers polymerized with the polyurethane resin can be any compounds which have an ethylenic unsaturated bond, without restriction. Concrete examples include nitriles such as acrylonitrile and methacrylonitriles etc., amideo such as acrylamide, methacrylamide and N-methylolacrylamide, etc., acrylates such as methyl acrylate, ethyl acrylate and 2-ethylhexyl acrylate, etc., methacrylates such as methyl methacrylate, ethyl methacrylate and 2-ethylhexyl methacrylate, etc., acrymates and methacrylates containing hydroxyl groups, such as 2-hydroxyethyl methacrylate, 2-hydroxypropyl methacrylate, 2-hydroxyethyl acrylate and 2-hydroxypropyl acrylate, etc., acid s such as acrylic acid, methacrylic acid, maleic acid, malonic acid and itaconic acid, etc., aromatic hydrocarbons such as styrene, vinyltoluene and α-methylstyrene, etc., and pyridines such as 2-vinylpyridine, etc. These compounds can be employed singly, or they can be employed in combinations of 2 or more.

The polymerization can be carried out in the presence of an ordinary polymerization initiator. As polymerization initiators organic peroxides such as benzoyl peroxide, t-butyl peroxide and cumene hydroperoxide, etc., organic azo compounds such as azobisisobutyronitrile and azobis (2,4-dimethyl)valeronitrile, etc., water-soluble inorganic initiators and redox initiators are ideally employed.

The polymerization can be performed under prior known conditions. Various methods can be adopted, including drip polymerization of the ethylenic unsaturated monomer or drip polymerization with partial preload, drip polymerization in 2 stages changing the composition of the ethylenic unsaturated monomer, or emulsifying and dispersing the ethylenic unsaturated monomer with the aqueous dispersion of the polyurethane resin and/or a surfactant and drip polymerizing this dispersion.

As surfactants ordinary cationic surfactants, anionic surfactants and non-ionic surfactants can be employed, and these can be employed in combination; however, from the point of view of water-resistance low-molecular-weight surfactants are preferably not used, and polymerization in a soap-free system is preferred.

As cationic surfactants, quaternary ammonium salts or pyridinium salts, etc., can be employed; examples include stearyldimethylbenzylammonium chloride and N,N,N-trimethyl-N-perfluorooctanesulfonamidopropylammonium chloride, etc.

Anionic surfactants include alkyl sulfonates and alkylaryl sulfonates, aliphatic alcohol sulfate or sulfosuccinate esters, and active agents having a perfluoroalkyl group, such as perfluorooctanesulfonic acid ammonium salt, etc.

Non-ionic surfactants include polyoxyethylene alkylphenol ethers such as polyoxyethylene nonylphenyl ether, etc.

The proportions by weight of aqueous dispersion of polyurethane resin and ethylenic unsaturated monomer, as a weight ratio, give polyurethane resin/ethylenic unsaturated monomer 5/95–60/40, and preferably 20/80–50/50.

Water-based paint compositions of the present invention contain an aqueous dispersion of a polyurethane resin graft polymer, obtained as above, and a hardener. The proportions of the two are 50–10 parts by weight, and preferably 40–20 parts by weight, of hardener to 50–90 parts by weight, and preferably 60–80 parts by weight of solids of the aqueous dispersion of a polyurethane resin graft polymers (the sum of the two being 100 wt %).

Hardeners above include amino compounds, blocked isocyanate compounds, isocyanate compounds and epoxy compounds, etc.

Examples of amino compounds include Cymel 301, Cymel 303, Cymel 325 and Cymel 327 (all trade marks of Mitsui SciTech), Nikalac MW-30 and Nikalac MX-43 (all trade marks of Sanwa Chemical) and Yuban 12 (trade mark Mitsui Toatsu Chemicals), etc., but are not restricted to these. When the hardener is an isocyanate component a twin-pack hardening system is desirable.

Epoxy compounds include alicyclic, aromatic and aliphatic epoxides containing $\geq 2$ epoxy groups, such as Epicote 828, Epicote 1001 (both trade marks of Shell Chemicals) and Epolite 40E, Epolite 400E and Epolite #1600 (all trade marks of Kyoei Chemicals), etc.

Different types of hydrophilic organic solvent can also be added to water-based paint compositions of the present invention if necessary. Examples of such organic solvents include ethylene glycol monoethyl ether, ethylene glycol monohexyl ether, diethylene glycol monobutyl ether and propylene glycol monobutyl ether and propylene glycol monopropyl ether, etc.

Metallic pigments, inorganic pigments and/or organic pigments can optionally be included in water-based paint compositions of the present invention. There are no specific restrictions as to the method for adding pigments, which can be done by a prior known method. Known additives added to prior water-based paint, such as acid catalysts, surface modifying agents, antifoaming agents and thickeners, etc., can also optionally be included.

The primary possible use of water-based paint compositions of the present invention is as base finishing coats for automobiles, but they are not restricted to this use. When employed as base finishing coats for automobiles the same techniques can be used as with ordinary water-based base finishing coats, and they are particularly suitable for known 2-coats/1-bake painting systems in which the base finishing coat and top finishing coat are applied wet-on-wet and then both are stoved simultaneously.

DETAILED DESCRIPTION OF THE INVENTION

In aqueous dispersions of a polyurethane resin of the present invention the number-average molecular weight of the polyurethane resin is 1000–50,000, the acid value from carboxyl groups is $\leq 50$ mg KOH/g, content of sulfonic acid groups and/or sulfonate groups is 0.05–0.6 mol/1000 g, the allyl content is 0.1–1.1 mol and the acetate tolerance is $\geq 5$, and so dispersion stability is excellent and they can polymerize with various ethylenic unsaturated monomers.

Aqueous dispersions of a polyurethane resin graft copolymer of the present invention are formed by polymerizing set quantities of an aqueous dispersion of a polyurethane resin above and ethylenic unsaturated monomers in an aqueous medium, and so little coagulation is produced during polymerization, dispersion stability is excellent, and they can form paint films with outstanding basic paint film performance traits such as appearance and water-resistance, etc.

Water-based paint compositions of the present invention contain specified quantities of an aqueous dispersion of a polyurethane resin graft polymer above and a hardener, and so storage stability is excellent and they can form paint films with outstanding basic paint film performance traits such as appearance and water-resistance, etc.

The present invention will be explained in more detail by means of practical embodiments. The present invention is not restricted to these embodiments. Parts and percentages in the examples are based on weight.

EMBODIMENT 1

Making an Aqueous Dispersion of a Polyurethane Resin A-1

First of all, neopentyl glycol 527.8 parts, hexane-1,6-diol 326.6 parts and adipic acid 145.6 parts were polycondensed to make a polyester diol A-1 having an acid value of 4 mg KOH/g, a hydroxyl group value of 75 mg KOH/g and a number average molecular weight of 1400.

A mixture comprising polyester diol A-1 above 585.3 parts, hexane-1,6-diol 64.5 parts, dimethylolpropanoic acid 39.2 parts, trimethylolpropane monoallyl ether 23.4 parts and methyl ethyl ketone 292.6 parts was put into a 5-liter reaction vessel fitted with a stirrer, reflux cooler and thermometer. Isophorone diisocyanate 458.2 parts was added to this mixture, and after mixing by raising the temperature to 90° C. and stirring for 10 minutes, dibutyltin laurate 1.2 part was added. The reaction proceeded for a further 5 hours at 90° C.

2-Hydroxyethanesulfonic acid 57.9 parts was then added and reacted for 2 hours. Trimethylolpropane 69.0 parts was then added, and the reaction was continued with the temperature raised to 100° C.

The disappearance of isocyanate groups was confirmed by the Siggia-Hanna method (*Anal. Chem.* 20, 1084 (1948)). This was followed by cooling to 60° C., and then N-dimethylethanolamine 53.5 parts was added and stirred for 30 minutes, to obtain polyurethane resin A-1.

The resulting polyurethane resin A-1 was a polyurethane resin which had a number-average molecular weight of 2700, an acid value from carboxyl groups of 14.1 mg KOH/g, a sulphonate group content of 0.34 mol, an allyl content of 0.3 mol and an acetate tolerance of $\geq 5$. Deionized water 2355.2 parts was added to this polyurethane resin A-1 with vigorous stirring. Finally the methyl ethyl ketone was distilled off under decreased pressure to obtain an aqueous dispersion of polyurethane resin A-1. This aqueous dispersion A-1 was a white turbid stable aqueous dispersion of 35% solids. The physical properties of polyurethane resin A-1 are shown in Table 1.

EMBODIMENT 2

Making an Aqueous Dispersion of a Polyurethane Resin A-2

First of all, neopentyl glycol 277.6 parts, hexane-1,6-diol 140.0 parts, 1,3-dicarboxybenzenesulfonic acid 85.3 parts and isophthalic acid 497.1 parts were polycondensed to make a polyester diol A-2 containing sulfonate groups, which had an acid value from carboxyl groups of 2 mg KOH/g, a sulfonate group content of 0.39 mol/100 g solids, a hydroxyl group value of 67.6 mg KOH/g and a number-average molecular weight of 1600.

A mixture comprising polyester diol A-2 above 601.3 parts, hexane-1,6-diol 133.9 parts, trimethylolpropane monoallyl ether 24.1 parts and methyl ethyl ketone 300.7 parts was put into a 5-liter reaction vessel fitted with a stirrer, reflux cooler and thermometer. Isophorone diisocyanate 443.4 parts was added to this mixture, which was then stirred as the temperature was raised to 90° C. After 10 minutes, dibutyltin dilaurate 1.2 part was added. The reaction was then continued for a further 5 hours at 90° C.

Trimethylolpropane 92.1 parts was then added, and the reaction was continued with the temperature raised to 100° C. The disappearance of isocyanate groups was confirmed by the same method as in Embodiment 1. This was followed by cooling to 60° C., and then N-dimethylethanolamine 18.4 parts was added and stirred for 30 minutes, to obtain polyurethane resin A-2.

The resulting polyurethane resin A-2 was a polyurethane resin which had a number-average molecular weight of 3800, an acid value from carboxyl groups of 0.9 mg KOH/g, a sulphonate group content of 0.18 mol, an allyl content of 0.4 mol and an acetate tolerance of $\geq 5$. Deionized water 2384.9 parts was added to this polyurethane resin A-2 with vigorous stirring. Finally the methyl ethyl ketone was distilled off under decreased pressure to obtain an aqueous dispersion A-2 of polyurethane resin A-2. This aqueous dispersion A-2 was a white turbid stable aqueous dispersion of 35% solids. The physical properties of polyurethane resin A-2 are shown in Table 1.

EMBODIMENT 3

Making Aqueous Dispersion of a Polyurethane Resin A-3

First of all, neopentyl glycol 182.8 parts, hexane-1,6-diol 240.2 parts and isophthalic acid 577.1 parts were polycondensed to make a polyester diol A-3 which had an acid value of 4 mg KOH/g, a hydroxyl group value of 57.7 mg KOH/g and a number-average molecular weight of 2300.

A mixture comprising polyester diol A-3 above 613.4 parts, hexane-1,6-diol 124.6 parts, trimethylolpropane monoallyl ether 24.5 parts, 1,4-dihydroxyethanesulfonic acid 37.4 parts and methyl ethyl ketone 306.7 parts was put into a 5-liter reaction vessel fitted with a stirrer, reflux cooler and thermometer. Isophorone diisocyanate 426.8 parts was added to this mixture, which was then mixed by raising the temperature 60° C. and stirring for 10 minutes, after which dibutyltin dilaurate 1.2 part was added. The reaction was then continued for a further 5 hours at 90° C.

Trimethylolpropane 65.8 parts was then added, and the reaction was continued with the temperature raised to 100° C. The disappearance of isocyanate groups was confirmed by the same method as in Embodiment 1. This was followed by cooling to 60° C., and then N-dimethylethanolamine 15.6 parts was added and stirred for 30 minutes, to obtain polyurethane resin A-3.

The resulting polyurethane resin A-3 was a polyurethane resin which had a number-average molecular weight of 5300, an acid value from carboxyl groups of 1.9 mg KOH/g, a sulphonate group content of 0.17 mol, an allyl content of 0.6 mol and an acetate tolerance of $\geq 5$. Deionized water 2384.2 parts was added to this polyurethane resin A-3 with vigorous stirring. Finally the methyl ethyl ketone was distilled off under decreased pressure to obtain an aqueous dispersion A-3 of polyurethane resin A-3. This aqueous dispersion A-3 was a white turbid stable aqueous dispersion of 35% solids. The physical properties of polyurethane resin A-3 are shown in Table 1.

EMBODIMENT 4

Making an Aqueous Dispersion of a Polyurethane Resin A-4

A mixture comprising polyester diol A-2 containing sulfonate groups employed in Embodiment 2 628.2 parts, hexane-1,6-diol 154.9 parts, trimethylolpropane monoallyl ether 18.8 parts and methyl ethyl ketone 314.1 parts was put into a 5-liter reaction vessel fitted with a stirrer, reflux cooler and thermometer. Isophorone diisocyanate 414.6 parts was added to this mixture, which was then stirred as the temperature was raised to 90° C. After 10 minutes dibutyltin dilaurate 1.3 part was added. The reaction was then continued for a further 5 hours.

Trimethylolpropane 33.7 parts was then added, and the reaction was continued with the temperature raised to 100° C. The disappearance of isocyanate groups was confirmed by the same method as in Embodiment 1. This was followed by cooling to 60° C., and then N-dimethylethanolamine 17.2 parts was added and stirred for 30 minutes, to obtain polyurethane resin A-4.

The resulting polyurethane resin A-4 was a polyurethane resin which had a number-average molecular weight of 10,300, a sulphonate group content of 0.17 mol, an acid value from carboxyl groups of 0.9 mg KOH/g, an allyl content of 0.44 mol and an acetate tolerance of $\geq 5$. Deionized water 2377.5 parts was added to this polyurethane resin A-4 with vigorous stirring. Finally the methyl ethyl ketone was distilled off under decreased pressure to obtain an aqueous dispersion A-4 of polyurethane resin A-4. This aqueous dispersion A-4 was a white turbid stable aqueous dispersion of 35% solids. The physical properties of polyurethane resin A-4 are shown in Table 1.

TABLE 1

| | Embodiment | | | |
|---|---|---|---|---|
| Starting materials (parts by wt) | 1 | 2 | 3 | 4 |
| Polyester diol A-1 | 583.5 | — | — | — |
| Polyester diol A-2 | — | 601.3 | — | 628.2 |
| Polyester diol A-3 | — | — | 613.4 | — |
| 1,6-Hexanediol | 64.5 | 133.9 | 124.6 | 154.9 |
| Dimethylolpropionic acid | 39.2 | — | — | — |
| Trimethylolpropane monoallyl ether | 23.4 | 24.1 | 24.5 | 18.8 |
| 1,4-Dihydroxyethanesulfonic acid | — | — | 37.4 | — |
| Methyl ethyl ketone | 292.6 | 300.7 | 306.7 | 314.1 |
| Isophorone diisocyanate | 458.2 | 443.4 | 426.8 | 414.6 |
| Dibutyltin dilaurate | 1.2 | 1.2 | 1.2 | 1.3 |
| 2-Hydroxyethanesulfonic acid | 57.9 | — | — | — |
| Trimethylolpropane | 69.0 | 92.1 | 65.8 | 33.7 |

TABLE 1-continued

| | Embodiment | | | |
|---|---|---|---|---|
| | 1 | 2 | 3 | 4 |
| H-Dimethylethanolamine | 53.5 | 18.4 | 15.6 | 17.2 |
| Deionized water | 2355.2 | 2384.9 | 2384.2 | 2377.5 |
| Properties | | | | |
| Number average molecular weight | 2700 | 3800 | 5300 | 10300 |
| Carboxyl group acid value | 14.1 | 0.9 | 1.9 | 0.9 |
| Sulfonate group content (mol/1000 g solids) | 0.34 | 0.18 | 0.17 | 0.17 |
| Allyl content (mol/mol) | 0.3 | 0.4 | 0.6 | 0.44 |
| Acetate tolerance *1 | ≧5 | ≧5 | ≧5 | ≧5 |
| Solids (wt %) | 35 | 35 | 35 | 35 |

Notes Table 1

*Acetate tolerance

The weight of aqueous acetate solution at the point at which coagulation was produced when a 10 wt % aqueous solution of an acetate, formed by neutralizing acetic acid by mixing with N-dimethylethanolamine in the ratio (w/w) 40/60, was added dropwise to 100 g of an aqueous dispersion of the polyurethane resin of 10 wt % resin solids, prepared by mixing deionized water with polyurethane resin in which 80% of the acid value has been neutralized with N-dimethylethanolamine. The point at which coagulation was produced was the point at which the dry weight of coagulum separated by filtration using a 400 mesh filter reached ≧50%.

EMBODIMENT 5

Making an Aqueous Dispersion of a Polyurethane Resin Graft Copolymer B-1

Aqueous dispersion A-1 of the polyurethane resin obtained in Embodiment 1 200 parts and deionized water 473.9 parts were added to a 2-liter reaction vessel fitted with a stirrer, reflux cooler, thermometer and dropping funnel, and thoroughly stirred. The temperature was then raised to 80° C., and a mixture of ethylenic unsaturated monomers comprising styrene 28.0 parts, lauryl methacrylate 56.0 parts, butyl acrylate 11.8 parts, methyl methacrylate 112.0 parts, 2-hydroxyethyl methacrylate 65.0 parts and acrylic acid 7.3 parts, and an aqueous solution comprising ammonium persulfate 0.42 parts and deionized water 41.58 parts, were introduced dropwise over 2 hours; and the polyurethane resin was reacted with the ethylenic unsaturated monomers. One hour after completing the dropwise addition an aqueous solution comprising ammonium persulfate 0.04 parts and deionized water 3.96 parts was added. Stirring was continued for a further 1 hour, to complete the reaction. After cooling, the mixture was passed through a 400-mesh filter to obtain an aqueous dispersion B-1 of a polyurethane graft polymer. This aqueous dispersion B-1 was a stable aqueous dispersion which left a filtration residue of 0.02% on the 400-mesh filter. In passing, filter residue is expressed as wt % of the dry residue of aqueous dispersion B-1. The starting materials, etc, are summarized in Table 2.

EMBODIMENTS 6–10

Making Aqueous Dispersions B-2 to B-5 of Polyurethane Resin Graft Polymers

Turbid white stable aqueous dispersions B-2 to B-5 were obtained by the same method as in Embodiment 5 with the compounds shown in Table 2 and Table 3. The quantities of coagulation are shown in Table 2 to Table 3.

EMBODIMENT 11

Making Aqueous Dispersion B-6 of a Polyurethane Resin Graft Copolymer

Aqueous dispersion A-2 of the polyurethane resin obtained in Embodiment 2 200 parts and deionized water 287.3 parts were added to a 2-liter reaction vessel fitted with a stirrer, reflux cooler, thermometer and dropping funnel, and thoroughly stirred. The temperature was then raised to 80° C., and a suspension of ethylenic unsaturated monomers comprising styrene 56.0 parts, butyl acrylate 99.4 parts, methyl methacrylate 56.0 parts, 2-hydroxyethyl methacrylate 65.0 parts and acrylic acid 3.6 parts pre-emulsified and dispersed in deionized water 183.9 parts and (nonylphenol+5 mol ethylene oxide) sulphate ammonium salt 2.8 parts was introduced dropwise over 2 hours, together with a polymerization initiator solution of butyl peroxide 4.2 parts and methoxypropanol 37.8 parts. One hour after completing the dropwise addition a mixture of butyl peroxide 0.4 part and methoxypropanol 3.6 parts was added as a kicker. Stirring was continued for a further 1 hour, to complete the reaction.

The subsequent procedure was as in Embodiment 5, to obtain a stable aqueous dispersion B-6. The quantity of coagulation is shown in Table 3.

TABLE 2

| | Units in the formula parts by weight Embodiment | | | |
|---|---|---|---|---|
| | 5 | 6 | 7 | 8 |
| Aqueous dispersion of polyurethane resin | | | | |
| A-1 of Embodiment 1 | 200 | — | — | — |
| A-2 of Embodiment 2 | — | 200 | — | — |
| A-3 of Embodiment 3 | — | — | 200 | — |
| A-4 of Embodiment 4 | — | — | — | 200 |
| Deionized water | 473.9 | 473.9 | 473.9 | 473.9 |
| Styrene | 28.0 | 28.0 | 28.0 | 28.0 |
| Lauryl methacrylate | 56.0 | 56.0 | — | — |
| Butyl methacrylate | 11.8 | 64.1 | 75.0 | 75.0 |
| Methyl methacrylate | 112.0 | 56.0 | 112.0 | 112.0 |
| 2-Hydroxyethyl methacrylate | 65.0 | 65.0 | 65.0 | 65.0 |
| Acrylic acid | 7.3 | 10.9 | — | — |
| Ammonium persulfate | 0.42 | 0.42 | 0.42 | 0.42 |
| Deionized water | 41.58 | 41.58 | 41.58 | 41.58 |
| Ammonium persulfate | 0.04 | 0.04 | 0.04 | 0.04 |
| Deionized water | 3.96 | 3.96 | 3.96 | 3.96 |
| Butyl peroxide | — | — | — | — |
| Methylpropylene glycol | — | — | — | — |
| Butyl peroxide | — | — | — | — |
| Methylpropylene glycol | — | — | — | — |
| Flocculation (dry weight %) | 0.02 | 0.02 | 0.01 | 0.02 |

TABLE 3

| | Units in the formula parts by weight Embodiment | | |
|---|---|---|---|
| | 9 | 10 | 11 |
| Aqueous dispersion of polyurethane resin | | | |
| A-1 of Embodiment 1 | — | — | — |
| A-2 of Embodiment 2 | 200 | 200 | 200 |

TABLE 3-continued

|  | Units in the formula parts by weight Embodiment | | |
|---|---|---|---|
|  | 9 | 10 | 11 |
| A-3 of Embodiment 3 | — | — | — |
| A-4 of Embodiment 4 | — | — | — |
| Deionized water | 473.9 | 473.9 | 287.3 |
| Styrene | 56.0 | 42.0 | 56.0 |
| Lauryl methacrylate | — | — | — |
| Butyl methacrylate | 156.0 | 63.8 | 99.4 |
| Methyl methacrylate | — | 42.1 | 56.0 |
| 2-Hydroxyethyl methacrylate | 65.0 | 48.7 | 65.0 |
| Acrylic acid | — | 13.4 | 3.6 *1 |
| Ammonium persulfate | — | 0.42 |  |
| Deionized water | — | 41.58 | *2 |
| Ammonium persulfate | — | 0.04 | — |
| Deionized water | — | 3.96 | — *2 |
| Butyl peroxide | 4.2 | — |  |
| Methylpropylene glycol | 37.8 | — | *2 |
| Butyl peroxide | 0.4 | — |  |
| Methylpropylene glycol | 3.6 | — | *2 |
| Flocculation (dry weight %) | 0.03 | 0.01 | 0.01 |

Notes Table 3

*1 The monomers were pre-emulsified and dispersed in deionized water 183.9 parts and (nonylphenol+5 mol ethylene oxide) sulfate ammonium salt 2.8 parts.

*2 A mixture of butyl peroxide 4.2 parts and methoxypropanol 37.8 parts was employed as the polymerization initiator solution. A mixture of butyl peroxide 0.4 part and methoxypropanol 3.6 parts was employed as a kicker.

EMBODIMENTS 12–18

Making and Testing Water-Based Paints

Metallic water-based paint compositions of 30% solids were prepared by adding an aqueous composition B-1 to B-7 of a polyurethane resin graft polymer, an aluminum paste (Alupaste 0539X, specially processed aluminum for metallic paint, heating residue 69%; trade mark Toyo Aluminium), an amino resin (Cymel 327; trade mark Mitsui SciTech), N-dimethylethanolamine, deionized water and butyl cellosolve. After correcting the pH of the metallic paint composition to 8.0 with N-dimethylethanolamine, the viscosity at a rotation of 6 rpm using a Brookfield viscosimeter was adjusted to 15±2 ps by adding water.

The metallic water-based paint compositions above were painted by the method below. Firstly a cationic electrodeposition paint (Aqua No. 4200, trade mark Nippon Oil and Fats) was electrocoated onto zinc-phosphate-treated sheet steel to give a dry film thickness of 20 μm and then stoved at 175° C. for 20 minutes, and then a middle coat paint was air sprayed to give a dry film thickness of 40 μm, followed by stoving at 140° C. for 20 minutes to give a middle coated test piece. This middle coated test piece was then painted with a metallic paint composition of an embodiment by the 2-coats/1-bake method. Thus, the metallic water-based paint composition was spray coated to give a dry film thickness of 15 μm in a paint film environment at a temperature of 25° C. and 75% relative humidity, and then dried by heating at 80° C. for 10 minutes. After cooling to room temperature, a commercial clear finishing coat paint (Velcoat No. 6000, trade name Nippon Oil and Fats) was spray coated to give a dry film thickness of ca. 40 μm, and after setting for 10 minutes was stoved for 30 minutes at 140° C. Throughout the whole process the sheet being painted was placed in the upright position.

The metallic water-based paint compositions and paint films were evaluated by the methods below. The results are shown in Table 5.

(Storage stability)

The change (%) in viscosity of the metallic paint relative to its initial viscosity (ps/6 rpm (Brookfield viscosimeter)) was evaluated after storage for 20 days at 40° C., and evaluated according to the following criteria.

o: <±15% x: ≧±15%

(Paint film appearance)

1) 60° C. gloss: According to JIS K5400 (1990) 7.6 Mirror gloss.

2) Smoothness: Assessed according to the following criteria based on observation with the naked eye.

o: good x: poor

3) Variation in aluminum: Assessed by visual observation according to the following criteria.

o: no variation x: variation (Paint film performance)

1) Water resistance: Assessed by visual observation after immersion for 4 hours in hot water at ≧90° C., according to the following criteria.

o: no abnormality x: blistering

TABLE 4

|  | Units in formulae: parts by weight Embodiments | | | | | | |
|---|---|---|---|---|---|---|---|
|  | 12 | 13 | 14 | 15 | 16 | 17 | 18 |
| Aqueous dispersion of polyurethane resin graft copolymer |  |  |  |  |  |  |  |
| B-1 of Embodiment 5 | 51.3 | — | — | — | — | — | — |
| B-2 of Embodiment 6 | — | 51.3 | — | — | — | — | — |
| B-3 of Embodiment 7 | — | — | 51.3 | — | — | — | — |
| B-4 of Embodiment 8 | — | — | — | 51.3 | — | — | — |
| B-5 of Embodiment 9 | — | — | — | — | 51.3 | — | — |
| B-6 of Embodiment 10 | — | — | — | — | — | 51.3 | — |
| B-7 of Embodiment 11 | — | — | — | — | — | — | 51.3 |
| Cymel 327 *1 | 8.5 | 8.5 | 8.5 | 8.5 | 8.5 | 8.5 | 8.5 |
| Butyl cellosolve | 9.0 | 9.0 | 9.0 | 9.0 | 9.0 | 9.0 | 9.0 |
| Aluminum paste *2 | 5.6 | 5.6 | 5.6 | 5.6 | 5.6 | 5.6 | 5.6 |

TABLE 4-continued

| | Units in formulae: parts by weight Embodiments | | | | | | |
|---|---|---|---|---|---|---|---|
| | 12 | 13 | 14 | 15 | 16 | 17 | 18 |
| Organic thickener *3 | 1.8 | 1.8 | 1.8 | 1.8 | 1.8 | 1.8 | 1.8 |
| N-Dimethylethanolamine | 0.8 | 0.8 | 0.8 | 0.8 | 0.8 | 0.8 | 0.8 |
| Deionized water | 23.0 | 23.0 | 23.0 | 23.0 | 23.0 | 23.0 | 23.0 |

*1 Trade mark Mitsui SciTech melamine resin
*2 Alumipaste 0539X; trade name Toyo Aluminium
*3 Primal ASE-60; trade name Rohm & Haas

TABLE 5

| | Embodiment | | | | | | |
|---|---|---|---|---|---|---|---|
| | 12 | 13 | 14 | 15 | 16 | 17 | 18 |
| (Paint film thickness) | | | | | | | |
| Base coat (μm) | 14 | 15 | 15 | 15 | 14 | 15 | 15 |
| Clear coat (μm) | 40 | 40 | 40 | 41 | 40 | 40 | 40 |
| (Paint film appearance) | | | | | | | |
| 60° gloss | 94 | 93 | 95 | 94 | 95 | 94 | 93 |
| Smoothness | 0 | 0 | 0 | 0 | 0 | 0 | 0 |
| Aluminum variation | 0 | 0 | 0 | 0 | 0 | 0 | 0 |
| Paint film performance, water resistance | 0 | 0 | 0 | 0 | 0 | 0 | 0 |
| Storage stability | 0 | 0 | 0 | 0 | 0 | 0 | 0 |

COMPARISON EXAMPLES 1–5

Aqueous dispersions a-1 to a-5 of polyurethane resins were made by the same method as in Embodiment 2 with the compounds in Table 6. The properties of the resulting polyurethane resins are shown in Table 6.

TABLE 6

| | Comparison Example | | | | |
|---|---|---|---|---|---|
| | 1 | 2 | 3 | 4 | 5 |
| Starting materials (parts by wt) | | | | | |
| Polyester diol A-1 of Embodiment 1 | 583.7 | — | — | — | — |
| Polyester diol A-2 of Embodiment 2 | — | 360.8 | 215.6 | 601.6 | 601.6 |
| 1,6-Hexanediol | 64.3 | 16.8 | 62.3 | 57.6 | 151.6 |
| Dimethylolpropionic acid | 39.1 | 230.2 | 28.9 | — | — |
| Trimethylolpropane monoallyl ether | 23.3 | 24.1 | 17.2 | 120.3 | — |
| Methyl ethyl ketone | 291.9 | 300.7 | 215.6 | 300.8 | 300.8 |
| Isophorone diisocyanate | 456.9 | 570.8 | 600.6 | 423.7 | 450.0 |
| Dibutyltin dilaurate | 1.2 | 1.2 | 0.9 | 1.2 | 1.2 |
| Trimethylolpropane | 130.4 | 92.0 | 462.2 | 91.4 | 91.4 |
| N-Dimethylethanolamine | 20.8 | 133.4 | 21.9 | 18.4 | 18.4 |
| Deionized water | 2388.4 | 2270.0 | 2374.8 | 2385.0 | 2385.0 |
| Properties | | | | | |
| Number average molecular weight | 2700 | 3700 | 700 | 3700 | 3700 |
| Carboxyl group acid value | 14.0 | 74.9 | 9.4 | 0.9 | 0.9 |
| Sulfonate group content (mol/1000 g solids) | 0 0.3 | 0.11 0.4 | 0.06 0.12 | 0.18 1.6 | 0.18 0 |
| Allyl content (mol/mol) | 0.5 | ≧5 | 1.0 | ≧5 | ≧5 |

TABLE 6-continued

| | Comparison Example | | | | |
|---|---|---|---|---|---|
| | 1 | 2 | 3 | 4 | 5 |
| Acetate tolerance *1 Solids (wt %) | 35.0 | 35.0 | 35.0 | 35.0 | 35.0 |

COMPARISON EXAMPLES 6–10

Aqueous dispersions b-1 to b-5 of polyurethane graft copolymers were made by the same method as in Embodiment 5 with the compounds in Table 7. The quantities of coagulation are shown in Table 7.

TABLE 7

| | Units in the formula parts by weight Embodiment | | | | |
|---|---|---|---|---|---|
| | 6 | 7 | 8 | 9 | 10 |
| Aqueous dispersion of polyurethane resin | | | | | |
| a-1 of Comparison Example 1 | 200 | — | — | — | — |
| a-2 of Comparison Example 2 | — | 200 | — | — | — |
| a-3 of Comparison Example 3 | — | — | 200 | — | — |
| a-4 of Comparison Example 4 | — | — | — | 200 | — |
| a-5 of Comparison Example 5 | — | — | — | — | 200 |
| Deionized water | 473.9 | 473.9 | 473.9 | 473.9 | 473.9 |
| Styrene | 28.0 | 28.0 | 28.0 | 28.0 | 28.0 |
| Lauryl methacrylate | 56.0 | 56.0 | 56.0 | 56.0 | 56.0 |
| Butyl methacrylate | 11.8 | 11.8 | 11.8 | 11.8 | 11.8 |
| Methyl methacrylate | 112.0 | 112.0 | 112.0 | 112.0 | 112.0 |
| 2-Hydroxyethyl methacrylate | 65.0 | 65.0 | 65.0 | 65.0 | 65.0 |
| Acrylic acid | 7.3 | 7.3 | 7.3 | 7.3 | 7.3 |
| Ammonium persulfate | 0.42 | 0.42 | 0.42 | 0.42 | 0.42 |
| Deionized water | 41.58 | 41.58 | 41.58 | 41.58 | 41.58 |
| Ammonium persulfate | 0.04 | 0.04 | 0.04 | 0.04 | 0.04 |
| Deionized water | 3.96 | 3.96 | 3.96 | 3.96 | 3.96 |
| Flocculation (dry weight %) | 5 | 0.01 | 3 | 4 | 0.5 |

COMPARISON EXAMPLES 11–15

Metallic water-based paints were made by the same method as in Embodiment 12 with the compounds in Table 8, and the paint films were assessed as in Embodiment 12. The results are shown in Table 9.

TABLE 8

| | Units in formulae: parts by weight Comparison Example | | | | |
|---|---|---|---|---|---|
| | 11 | 12 | 13 | 14 | 15 |
| Aqueous dispersion of polyurethane resin graft copolymer | | | | | |
| b-1 of Comparison Example 6 | 51.3 | — | — | — | — |
| b-2 of Comparison Example 7 | — | 51.3 | — | — | — |
| b-3 of Comparison Example 8 | — | — | 51.3 | — | — |
| b-4 of Comparison Example 9 | — | — | — | 51.3 | — |
| b-5 of Comparison Example 10 | — | — | — | — | 51.3 |
| Cymel 327 *1 | 8.5 | 8.5 | 8.5 | 8.5 | 8.5 |
| Butyl cellosolve | 9.0 | 9.0 | 9.0 | 9.0 | 9.0 |
| Aluminum paste *2 | 5.6 | 5.6 | 5.6 | 5.6 | 5.6 |
| Organic thickener *3 | 1.8 | 1.8 | 1.8 | 1.8 | 1.8 |
| N-Dimethylethanolamine | 0.8 | 0.8 | 0.8 | 0.8 | 0.8 |
| Deionized water | 23.0 | 23.0 | 23.0 | 23.0 | 23.0 |

*1 Trade mark Mitsui SciTech melamine resin
*2 Alumipaste 0539X; trade name Toyo Aluminium
*3 Primal ASE-60; trade name Rohm & Haas

TABLE 9

| | Comparison Examples | | | | |
|---|---|---|---|---|---|
| | 11 | 12 | 13 | 14 | 15 |
| (Paint film thickness) | | | | | |
| Base coat (μm) | 15 | 15 | 15 | 15 | 15 |
| Clear coat (μm) | 40 | 40 | 40 | 40 | 40 |
| (Paint film appearance) | | | | | |
| 60° gloss | 85 | 97 | 75 | 95 | 0 |
| Smoothness | x | ○ | x | ○ | ○ |
| Aluminum variation | ○ | x | x | ○ | ○ |
| Paint film performance, water resistance | ○ | x | x | ○ | x |
| Storage stability | x | ○ | x | ○ | x |

From the results above, the following facts are evident.

It is evident that the aqueous dispersions of Embodiments 5–11 obtained by polymerizing ethylenic unsaturated monomers with an aqueous dispersion (Embodiment 1–4) of a polyurethane resin within specific ranges for number-average molecular weight, acid value from carboxyl groups, sulfonate group content, ally content and acetate tolerance, which was used both as starting material and stabilizer, had outstanding dispersion stability with little coagulation. It is also evident that the water-based paint compositions of Embodiment 12–18 containing these aqueous dispersions had outstanding storage stability, and that the resulting paint films had outstanding appearance and water resistance.

By contrast, the polyurethane resin used in Comparison Example 1 did not have sulfonate groups and had an acetate tolerance of less than 5, and the aqueous dispersion of Comparison Example 6 made by polymerizing an aqueous dispersion of this polyurethane resin with ethylenic unsaturated monomers using the aqueous dispersion as starting material and stabilizer produced a lot of coagulation. In addition, the water-based paint composition of comparison Example 11 which contained this aqueous dispersion had poor storage stability and poor paint film gloss and smoothness.

In the case of the polyurethane resin used in Comparison Example 2 the acid value from carboxyl groups was too high, and paint files formed by the water-based paint composition of Comparison Example 12, which contained the aqueous dispersion of Comparison Example 7 made by polymerizing an aqueous dispersion of this polyurethane resin with ethylenic unsaturated monomers using the aqueous dispersion as starting material and stabilizer showed unevenness in aluminum and poor water resistance.

In the case of the polyurethane resin used in Comparison Example 3 the number-average molecular weight was small, and acetate tolerance was less than 5, and the aqueous dispersion of Comparison Example 8 made by polymerizing an aqueous dispersion of this polyurethane resin with ethylenic unsaturated monomers using the aqueous dispersion as starting material and stabilizer produced a lot of coagulation. In addition, the water-based paint composition of Comparison Example 13 which contained this aqueous dispersion had poor storage stability and poor paint film appearance and water-resistance.

The polyurethane resin used in comparison Example 4 had a large allyl content, and the aqueous dispersion of Comparison Example 9 made by polymerizing an aqueous dispersion of this polyurethane resin with ethylenic unsaturated monomers using the aqueous dispersion as starting material and stabilizer produced a lot of coagulation.

The polyurethane resin used in Comparison Example 5 did not include ally moieties, and the aqueous dispersion of Comparison Example 10 made by polymerizing an aqueous dispersion of this polyurethane resin with ethylenic unsaturated monomers using the aqueous dispersion as starting material and stabilizer produced a lot of coagulation. In addition, the water-based paint composition of Comparison Example 15 which contained this aqueous dispersion had poor storage stability and the paint films had poor water resistance.

What is claimed is:

1. An aqueous dispersion of a polyurethane resin comprising a polyurethane resin having a number-average molecular weight of 1000–50,000, an acid value from carboxyl groups of ≦50 mg KOH/g, a content of groups selected from the group consisting of sulfonic acid groups, sulfonate groups, and mixtures therof, of 0.05–0.6 mol per 1000 g of polyurethane resin, a content of allyl moieties of 0.1–1.1 mol per molecule of polyurethane resin, and an acetate tolerance of ≧5.

2. An aqueous dispersion of a polyurethane graft polymer comprising the result of polymerizing, in an aqueous medium, the aqueous dispersion of a polyurethane resin of claim 1 and one or more ethylenic unsaturated monomers in proportions as a weight ration of polyurethane resin/ethylenic unsaturated monomer of 5/95–60/40.

3. A water-based paint composition comprising a hardener at 50–10 parts by weight to 50–90 parts by weight (solids) of the aqueous dispersion of a polyurethane resin graft polymer of claim 2 (total of both is 100 parts by weight).

* * * * *